United States Patent [19]

Kawabata et al.

[11] Patent Number: 4,954,936
[45] Date of Patent: Sep. 4, 1990

[54] ASEISMATIC STRUCTURE OF AN INDICATING LAMP

[75] Inventors: Masaaki Kawabata, Toyonaka; Tokio Kawashima, Osaka, both of Japan

[73] Assignee: Sasaki Electric Corporation, Osaka, Japan

[21] Appl. No.: 450,259

[22] Filed: Dec. 13, 1989

[30] Foreign Application Priority Data

May 17, 1989 [JP] Japan .................................. 64-56828

[51] Int. Cl.$^5$ ............................................. F21V 21/00
[52] U.S. Cl. .................................... 362/249; 362/369;
362/431; 362/390
[58] Field of Search ................. 362/249, 369, 431, 390

[56] References Cited

U.S. PATENT DOCUMENTS 1,554,787  9/1925  Chason .................................. 362/390
4,533,983  8/1985  Hafstad ................................ 362/249

Primary Examiner—James C. Yeung
Attorney, Agent, or Firm—Spencer & Frank

[57] ABSTRACT

An indicating lamp having an aseismatic structure which includes an internal chassis for fixing an electric lamp and an electric control board, an indicating lamp cover covering the internal chassis, and a fixture for attaching an indicating lamp to an external structure. A boss having a flange portion is fitted to the fixture, and an insulating member is abuts one or both sides of the flange portion. In addition, a fixing plate constituting a part of the above internal chassis, the insulating member, the flange portion and the indicating lamp cover are clamped with clamping members fed through through-holes provided therethrough, with the above insulating member being held between the fixing plate and the indicating lamp cover. Cylindrical spacers each having a predetermined length and an internal diameter, and into which and from which the above bolt can be freely inserted and taken out, are fitted to the through-holes. The length of the spacers is set to the most suitable value so as to provide the most suitable clamping conditions corresponding to such considerations as the type of the insulating member and the type of vibration from which the electric lamp and electric control board are to be insulated.

6 Claims, 5 Drawing Sheets

PRIOR ART

ASEISMATIC STRUCTURE OF AN INDICATING LAMP

BACKGROUND OF THE INVENTION

The present invention relates to an aseismatic structure of an indicating lamp installed in an automatic machine, a robot, a production line, a parking lot or the like and used sending various signals for representing for example, that there is a shortage of materials, that work is jamming or that no parking place is available.

This type of indicating lamp is installed for improving safety of users or workers and alerting a need for maintenance of automatic machines and equipment by directing light of one or a plurality of colors to the surroundings as signals, thereby to call a user's safety or maintenance problem to the attention and guide the users.

The above described indicating lamp has a mounting pole so as to be simply installed in any place and is firmly fixed by a screw using a fixture attached to the end of this mounting pole.

However, there has been heretofore particularly provided no indicating lamp having an aseismatic structure. Therefore, if vibration is frequently produced in a place where the indicating lamp is attached, the vibration is received by the indicating lamp, and causes the structure of the indicating lamp to loosen and its electric lamp to blow out.

An attempt to introduce an aseismatic structure into this type of indicating lamp has been made. FIGS. 6 and 7 are diagrams showing a conventional aseismatic structure. In FIG. 6, A denotes a mounting pole of an indicating lamp, and A2 denotes a fixture. The fixture A2 is elastically and removably supported on the mounting pole A by a spring A1. This aseismatic structure is exposed to the exterior and can be directly viewed. In FIG. 7, A denotes an internal chassis of the indicating lamp, and A4 denotes an external cover of the indicating lamp. A rubber bushing A3 is interposed between the internal chassis A and the external case A4.

Furthermore, another aseismatic structure using an electric lamp of aseismatic specification as a light source has been known.

In the above described aseismatic structure shown in FIGS. 6 and 7, the vibration damping effect is obtained utilizing the natural elasticity of the elastic material of members A1 and A3. However, the vibration damping effect often varies due to uneven quality of the elastic material. In addition, the resonance phenomenon occurs at a particular oscillation frequency, which causes the electric lamp to be blown out.

Additionally, the use of an electric lamp of aseismatic specification is not an effective solution because vibration itself is not absorbed. More specifically, a failure due to vibration occurs in a portion other than the electric lamp. In addition, at the time of a strong vibration, the electric lamp is blown out.

Furthermore, an aseismatic structure portion is exposed to the external air. Accordingly, an aseismatic structure formed of elastic material such as rubber is degraded by the external environmental factors such as oil dust in factories. Consequently, the lifetime of the indicating lamp itself may be shortened.

SUMMARY OF THE INVENTION

An object of the present invention is to provide an aseismatic structure of an indicating lamp which has a constant aseismatic performance which does not vary for each insulating member and in which a resonance phenomenon does not easily occur.

Another object of the present invention is to pay attention to the design of the appearance by shielding an aseismatic structure portion from the outside and protect an aseismatic structure from the external environment.

Therefore, the present invention provides an aseismatic structure applied to an indicating lamp comprising an internal chassis for fixing an electric lamp and an electric contrOl board, an indicating lamp cover for covering the internal chassis, and a fixture for attaching the indicating lamp to an external structure, and having the following characteristics.

A boss having a flange portion is fitted to the above fixture. An insulating member is abutted from both sides or one side of the flange portion. In addition, the insulating member is sandwiched between a fixing plate constituting a part of the above internal chassis and the indicating lamp cover. The fixing plate, the insulating member, the flange portion, and the indicating lamp cover are clamped together with clamping members fed into through-holes provided &therethrough with the above insulating member being held between the fixing plate and the indicating lamp cover. Cylindrical spacers, each having a predetermined length and an internal diameter and into and from which the above clamping members can be freely inserted and taken out, are fitted into the through-holes.

The aseismatic structure of the indicating lamp is formed as described above. Accordingly, vibration transmitted from the fixture can be absorbed by the insulating member by clamping with the clamping members, so that the vibration can be prevented from being transmitted to the internal chassis.

Additionally, desired clamping conditions can be provided by selecting the length of the above spacers. More specifically, the pressure applied to the insulating member is reduced by clamping with increased length spacers, while the pressure is increased by clamping with the reduced length spacers. Accordingly, the most suitable clamping conditions corresponding to such factors as the type of the insulating member and the type of the vibration, can be easily set.

Furthermore, a clamping force which is always constant can be achieved because constant-length spacers exist. Consequently, the variation in aseismatic performance will be small for each product, so that the quality of the product is stabilized.

Additionally, the above described indicating lamp cover is provided with through-holes, to facilitate support of the fixing plate through the insulating member. Accordingly, the above insulating member is arranged inside of the indicating lamp cover and is covered with the indicating lamp cover. More specifically, it is possible to form a structure in which an aseismatic structure portion is hidden from view and protected from exposure to the external environment. Consequently, an aseismatic structure which is not degraded by the external environment can be provided and superior design of the appearance is obtained.

The foregoing and other advantages of the present invention will become more apparent from the following description when taken in conjunction with the accompanying drawings.

DESCRIPTION OF THE PREFERRED EMBODIMENT

Referring now to FIGS. 1 to 5, description is made of an aseismatic structure of an indicating lamp according to an embodiment the present invention.

Figure 1:
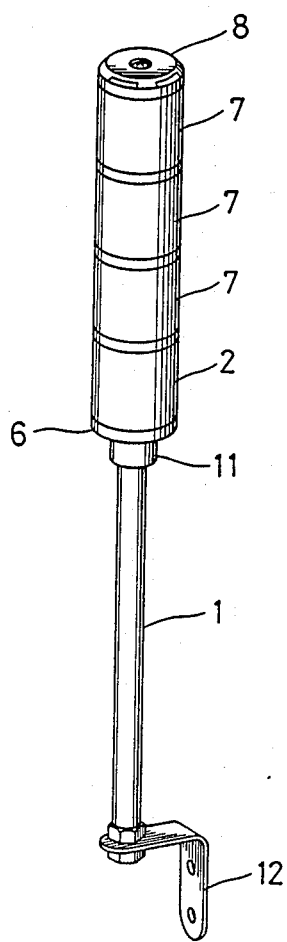
FIG. 1 is a perspective view showing the appearance of an indicating lamp.
Figure 3:
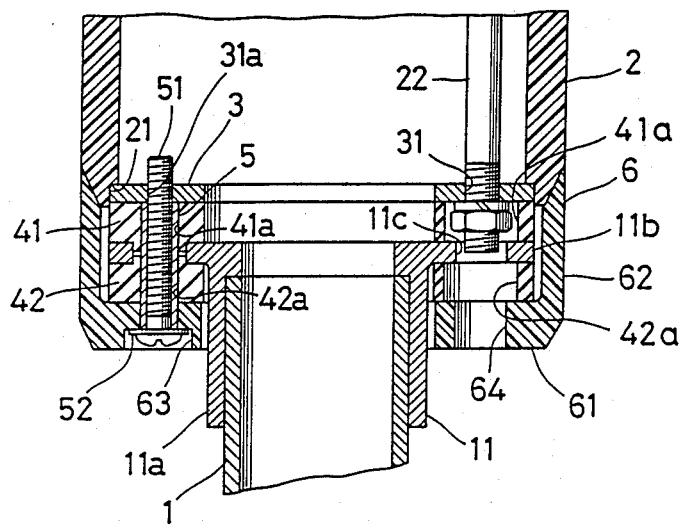
FIG. 3 is a cross-sectional view taken along a line A-0-A in FIG. 4 showing an aseismatic structure of the indicating lamp.
Figure 4:
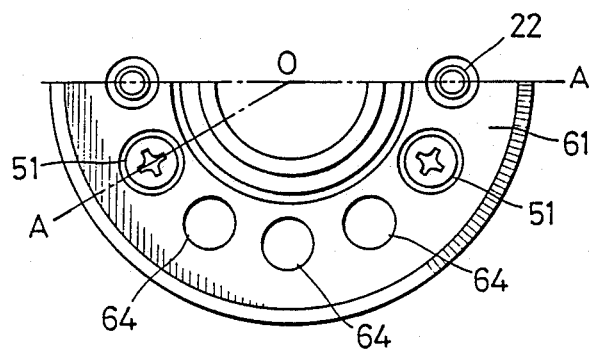
FIG. 4 is a diagram showing a bottom surface of the indicating lamp cover.

In FIG. 1, reference numeral 1 denotes a mounting pole for installing an indicating lamp according to the present invention. A pole fixture 12 is mounted on a lower end of the mounting pole 1. The indicating lamp may be fixed in a place where it is to be installed using this pole fixture 12. Alternatively, the mounting pole 1 may be directly attached to the place where the indicating lamp is installed without using the pole fixture 12. A pole boss 11 comprising a cylindrical portion 11a mounted on the mounting pole 1 and a flange portion 11b having a plurality of through-holes 11c on the disk plate of the flange portion 11b is mounted and fixed at an upper end of the mounting pole 1, as shown in FIGS. 3 and 5.

Reference numeral 2 denotes a bracket, in which wiring is arranged and a circuit board for flickering lamps is housed. The circuit board for flickering electric lamps 9 serving as the light source, is used for turning any of the electric lamps (see FIG. 2) on or off in response to an electrical input to the indicating lamp, for indicating an input signal. As shown in FIG. 3, a disk shaped fixing plate 3 provided with a plurality of through-holes 31 is fitted to a notch portion 21 on the inner side of a lower end of the bracket 2, and shafts 22 are adhered to the fixing plate 3 through the plurality of through-holes 31.

Figure 5:
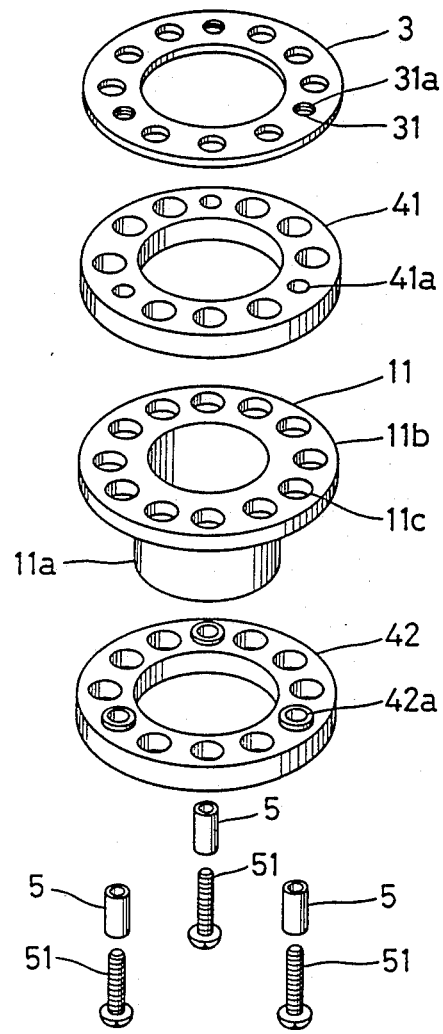
FIG. 5 is an exploded perspective view showing the main parts of the aseismatic structure of the indicating lamp.
Figure 6:
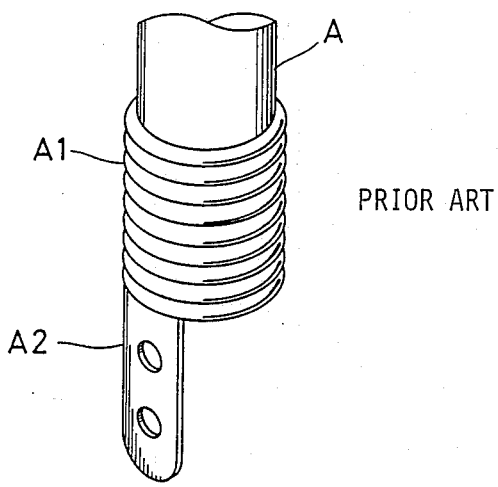
FIGS. 6 and 7 are partial diagrammatic views showing an aseismatic structure of conventional indicating lamps.
Figure 7:
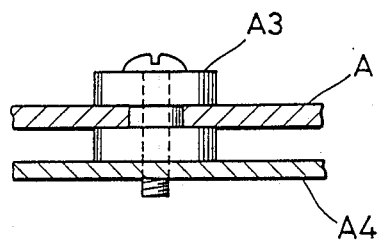

Reference numerals 41 and 42 denote insulating members formed of elastic material, which assume a doughnut-type disk shape respectively having a plurality of through-holes 41a and 42a and having a circular hole provided in its center (see FIG. 5). The elastic material may be of any quality provided it absorbs vibration. Low impact resilience rubber such as butyl special refining rubber "HANENITE" (Trade Mark) is suitable as the elastic material. A spring may be used in place of elastic rubber as material of the insulating members 41 and 42, to obtain almost the same effect. The number of each of the through-holes 41a and 42a is not particularly limited but must be at least the same as the number of bolts 51 as described below. However, a lot of through-holes provided at regular intervals except for ones for screwing purposes would be more suitable for vibration absorption (see the insulating member 41 in FIG. 5).

The indicating lamp cover 6 comprises a lower surface portion 61 having a plurality of through-holes 64 provided on its bottom disk plate and having a circular hole provided in the center of its bottom disk plate, and a cylindrical portion 62 engaged with a lower edge of the bracket 2 of the indicating lamp and a side edge of the lower surface portion 61.

Reference numeral 5 denotes a cylindrical spacer. Three of the above described through-holes 64 are selected and are fitted to a bolt 51 inserted thereinto through a washer 52 from a lower stepped portion 63 of each of the through-holes 64, to be screwed into screw portions 31a formed on the above through-holes 31, the bolts 51 being surrounded by respective spacers 5 which extend through through-holes 64, 42a and 41b. Although the numbers of the spacers 5 and the bolts 51 are respectively three for stability of installation, it should be noted that the members are not limited to three.

In addition to the above described portions, description is now made of an entire structure of the indicating lamp.

Figure 2:
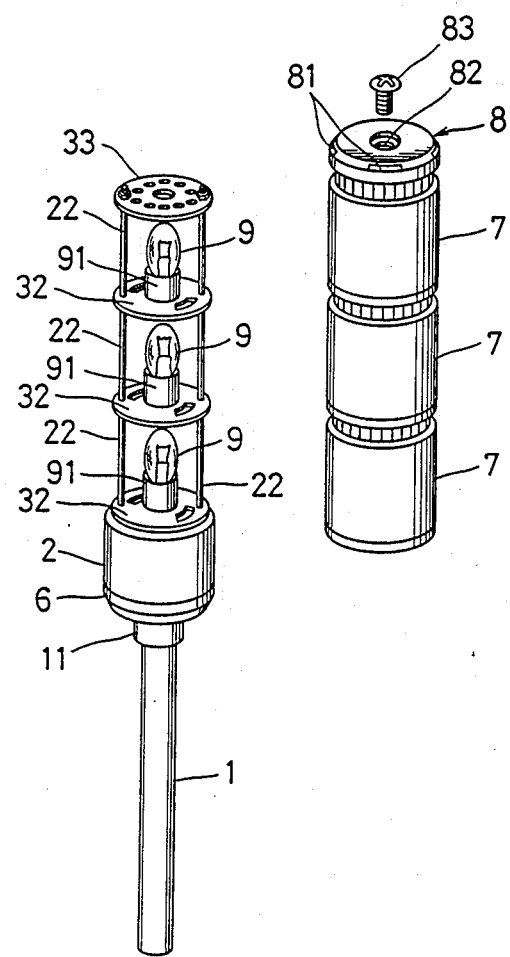
FIG. 2 is a perspective view showing the indicating lamp of FIG. 1 with a part of an indicating lamp cover removed.

As shown in FIG. 2, in the indicating lamp, a socket plate 32 having a socket 91 for removably supporting an electric lamp 9 attached theretO constitutes a light source portion. One or a plurality Of socket plates 32 are stacked, and fixed between a top plate 33 provided with a plurality of radiating holes and the above fixing plate 3. The socket plates are held by the shafts 22 which extend from two of the holes 31 in the fixing plate 3 to holes in the top plate 33. The shifts 22 fixed by nuts below the fixing plate 3 and above the top plate 33 using two shafts 22. An indicating lamp head cover 8 covering an uppermost portion of the indicating lamp is integrally formed with the periphery of its upper surface having a vault shape fixed to the periphery of its lower part. When an electric lamp is lit as a light source, a plurality of radiating holes 81 in the indicating lamp head cover 8 serve to discharge internal hot air. The indicating lamp head cover 8 is screwed into a mounting portion in an upper part of the above described top plate 33 through a mounting hole 82 using a screw 83. The gloves 7 have translucency and colors display light to emit the same. The gloves 7, which assume an nearly cylindrical shapes so as to surround respective light source portions from the outside, diffuse and emit light from the respective light sources in a lateral direction, to improve visibility of the indicating lamps themselves.

The entire structure of the indicating lamp is as described above. Description is now made of main parts of the aseismatic structure.

The aseismatic structure according to the present invention is attached to a place where an indicating lamp may be installed, for example, a machine or the like which vibrates itself. The aseismatic structure is adapted to separate and insulate members subjected to vibration from the main body of the indicating lamp. In the structure, the members directly subjected to vibration include the mounting pole 1, the pole boss 11, and the pole fixture 12. The other members are separated and insulated from vibration.

More specifically, the aseismatic structure is adapted such that the flange portion 11b of the pole boss 11 is not directly fixed to the fixing plate 3 of the indicating lamp or the lower surface portion 61 of the indicating lamp cover, and insulating members 41 and 42 respectively abut upper and lower parts of the flange portion 11b, and the insulating member 41 is held between the fixing plate 3 of the indicating lamp and the flange portion 11b, and the insulating member 42 is held between the flange portion 11b and the lower surface portion 61 of the indicating lamp cover to indirectly connect the members to each other. The spacers 5 are fitted to through-holes provided in each of the members and bolts 51 are inserted into the through-holes from the side of the lower surface portion 61 of the indicating lamp cover to clamp the members. In this case, if the members are clamped the bolts 51, the insulating members 41 and 42 are compressed until the bolts 51 are stopped at the position where the length between the fixing plate 3 and the lower surface portion 61 of the indicating lamp cover is equal to the length of the spacers 5. Numerical values are provided by way of example. The length of the spacer 5 is 15 mm, the thickness of the flange portion 11b is 2,5 mm, the thickness of the lower surface portion 61 of the indicating lamp cover is 6.2 mm, and the depth of the stepped portion 63 formed on the lower surface portion 61 of the indicating lamp cover is 3 mm. Accordingly, the original thicknesses of the insulating members 41 and 42 are respectively 5 mm but become 4.65 mm as a result of the compression. Therefore, the insulating members 41 and 42 are subjected to constant deformation irrespective of the magnitude of the clamping force of the bolt 51. Consequently, there can be provided a product whose aseismatic performance hardly varies and has a stable quality.

Furthermore, various spacers having different lengths are prepared and spacers each having a desired length can be selected therefrom to be used as the above described spacers 5. Consequently, one can set desired clamping conditions corresponding to material of the insulating members 41 and 42, the strength of vibration, the frequency of natural vibration, or the like.

Additionally, the above described insulating members 41 and 42 are completely covered by the indicating lamp cover 6 and the bracket 2, which together form a cover means, as shown in FIGS. 1 and 2. That is to say, it is possible to form a structure in which an aseismatic structure portion is hidden from view and protected from exposure to the external environment. Consequently, there can be provided an aseismatic structure the aseismatic property of which is not degraded by the external environment, and superior design of the appearance is obtained.

Although the present invention has been described in detail with reference to the accompanying drawings, the present invention is not limited to the above described particular embodiment. For example, while the above embodiment employs the bolt 51 for clamping, another means such as bonding with a rivet may be employed, to obtain the same effect. In addition, the aseismatic structure according to the present invention can be also used for various equipment such as a rotary warning lamp in which a light source is rotated. It should be understood that various modifications may be made without departing from the scope of the present invention.

What is claimed is:

1. An indicating lamp, comprising:
   an internal chassis having means for fixing an electric lamp and an electric control board thereto, aid internal chassis including a fixing plate, said fixing plate having through-holes formed therein;
   an indicating lamp cover means covering said internal chassis and having through-holes formed therein;
   a fixture for attaching the indicating lamp to an external structure;
   a boss fitted to said fixture and having a flange portion, said flange portion having a first side, a second side opposite said first side, and through-holes formed therein;
   an insulating member disposed between said fixing plate and said cover means, said insulating member abutting at least one of said first and second sides of said flange portion and having through-holes formed therein;
   clamping means, including clamping members extending through the through-holes of said cover means, said insulating member, said flange portion and said fixing plate, for clamping said insulating member, said flange portion, and said indicating lamp cover means to said fixing plate; and
   means, including cylindrical spacers fitted through the through-holes of said insulating member and said flange and each having a predetermined length, for limiting to a predetermined spacing a distance between said fixing plate and said indicating lamp cover means, said clamping members extending through said spacers, each of said spacers having an internal diameter permitting said clamping members to be freely withdrawn from and inserted into said spacers.

2. An indicating lamp according to claim 1, wherein at least a part of the indicating lamp cover means is in the form of a cylinder and a covering surface closing one end of said cylinder, the through-holes in said indicating lamp cover means being formed in said covering surface, said cylinder covering said insulating member and said flange portion.

3. The indicating lamp according to claim 1, wherein said clamping members comprise bolts.

4. The indicating lamp according to claim 1, wherein said clamping members consist of three clamping members, the through-holes of said cover means, of said insulating member, of said flange portion and of said fixing plate, through which said clamping members extend, consisting of three through-holes in each of said cover means, said insulating member, said flange portion and said fixing plate.

5. The indicating lamp according to claim 1, wherein said fixture comprises a pole.

6. A lamp, comprising:
   an internal chassis having a support for a light source and an electric control board, said internal chassis including a fixing plate, said fixing plate having through-holes formed therein;
   a lamp cover means covering said internal chassis and having through-holes formed therein aligned with the through-holes in said fixing plate;
   a fixture for attaching the lamp to an external structure;
   a boss fitted to said fixture and having a flange portion disposed between said fixing plate and said cover means, said flange portion having a first side, a second side opposite said first side, and through-holes formed therein aligned with the through-holes in said cover means and said fixing plate;
   an elastic, vibration insulating member for absorbing vibration applied to the lamp through the fixture, said insulating member being disposed between said fixing plate and cover means, said insulating member abutting at least one of said first and second sides of said flange portion and having through-holes formed therein aligned with the through-holes in said cover means, said fixing plate and said flange portion;

clamping means, including clamping members extending through the through-holes of said cover means, said insulating member, said flange portion and said fixing plate, for clamping said insulating member, said flange portion, and said lamp cover means to said fixing plate, with said insulating member in a state of compression; and means, including cylindrical spacers fitted through the through-holes of said insulating member and said flange and each having a predetermined length, for limiting to a predetermined spacing a distance between said fixing plate and said lamp cover means to thereby limit a degree of the compression of the insulating member, said clamping members extending through said spacers, each of said spacers having an internal diameter permitting said clamping members to be freely withdrawn from and inserted into said spacers.

* * * * *